United States Patent
Seibt et al.

(10) Patent No.: US 10,307,024 B2
(45) Date of Patent: Jun. 4, 2019

(54) DUAL MODE TOILET ASSEMBLY

(71) Applicant: Airbus Operations GmbH, Hamburg (DE)

(72) Inventors: Christian Seibt, Hamburg (DE); Jens Wiebalck, Hamburg (DE); Georg Rose, Landau/Pfalz (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 265 days.

(21) Appl. No.: 15/360,049

(22) Filed: Nov. 23, 2016

(65) Prior Publication Data

US 2017/0150855 A1    Jun. 1, 2017

(30) Foreign Application Priority Data

Nov. 27, 2015  (EP) .................................. 15196817

(51) Int. Cl.
*A47K 17/02* (2006.01)
*B64D 11/02* (2006.01)
(Continued)

(52) U.S. Cl.
CPC ............ *A47K 17/028* (2013.01); *A47K 17/02* (2013.01); *B64D 11/02* (2013.01); *E03D 11/02* (2013.01);
(Continued)

(58) Field of Classification Search
CPC .... A47K 17/028; A47K 17/02; A47K 17/022; E03D 11/135; E03D 11/04; E03D 11/02; E03D 11/13; B64D 11/02; Y02T 50/46
See application file for complete search history.

(56) References Cited

U.S. PATENT DOCUMENTS

| 1,243,148 A | * | 10/1917 | Erwin | ................... A47K 17/02 |
| | | | | 4/249 |
| 4,012,797 A | * | 3/1977 | Kristoffersen | ......... E03D 11/02 |
| | | | | 4/254 |

(Continued)

FOREIGN PATENT DOCUMENTS

| DE | 102011012281 A1 | 8/2012 |
| GB | 2490135 A | 10/2012 |
| JP | 2002320572 A | 11/2002 |

OTHER PUBLICATIONS

European Patent Office, Extended European Search Report for European Patent Application No. 15196817 dated May 12, 2016.

*Primary Examiner* — Valentina Xavier
(74) *Attorney, Agent, or Firm* — Lorenz & Kopf LLP

(57) ABSTRACT

A passenger lavatory unit has an enclosing structure enclosing a lavatory space, and a toilet assembly inside the lavatory space. The toilet assembly has a toilet bowl and a shroud to support the user during use. The toilet assembly serves as a hybrid toilet to be used as a sitting toilet or as a squatting toilet. The shroud includes an upper edge surrounding an upper opening of the toilet bowl. To accommodate a user sitting position, the upper edge is provided as a toilet seat, and a feet-placing area is provided on a floor segment in front of the toilet assembly. The shroud has two lateral tread portions, one on either side of the toilet bowl. To accommodate a user squatting position, the tread portions are provided as elevated rest-platforms arranged on an intermediate level provided above a floor level and below a toilet seat level.

15 Claims, 15 Drawing Sheets

(51) Int. Cl.
*E03D 11/13* (2006.01)
*E03D 11/02* (2006.01)
*E03D 11/04* (2006.01)

(52) U.S. Cl.
CPC .............. *E03D 11/04* (2013.01); *E03D 11/13* (2013.01); *E03D 11/135* (2013.01); *A47K 17/022* (2013.01); *Y02T 50/46* (2013.01)

(56) References Cited

U.S. PATENT DOCUMENTS

| | | | | |
|---|---|---|---|---|
| 4,584,725 A * | 4/1986 | Oliver | .................. | A47K 17/028 4/254 |
| 4,819,277 A * | 4/1989 | Sikirov | .................. | A47K 13/24 4/239 |
| 5,005,223 A * | 4/1991 | Greenwood | ........... | A47K 13/06 4/235 |
| 5,787,514 A * | 8/1998 | Erli | ........................ | A47K 13/06 4/237 |
| 5,987,567 A | 11/1999 | Byers | | |
| 6,385,782 B1 * | 5/2002 | Schneider | ............ | A47K 13/005 4/239 |
| D502,766 S * | 3/2005 | Nash | ............................. | D23/311 |
| 7,962,973 B2 * | 6/2011 | Sikirov | .................. | A47K 17/00 4/239 |
| 8,978,171 B1 * | 3/2015 | Wise | ....................... | A47K 13/24 4/254 |
| 9,445,696 B2 * | 9/2016 | Tordella | .................. | E03D 11/06 |
| 9,498,097 B2 * | 11/2016 | Grant | ..................... | A47K 13/06 |
| D816,819 S * | 5/2018 | Xu | ................................. | D23/311 |
| 2011/0179563 A1 * | 7/2011 | Chern | ....................... | E03D 9/00 4/420 |
| 2014/0208494 A1 * | 7/2014 | Ohira | ..................... | A47K 13/06 4/240 |
| 2017/0112338 A1 * | 4/2017 | Cheng | .................. | A47K 17/028 |

* cited by examiner

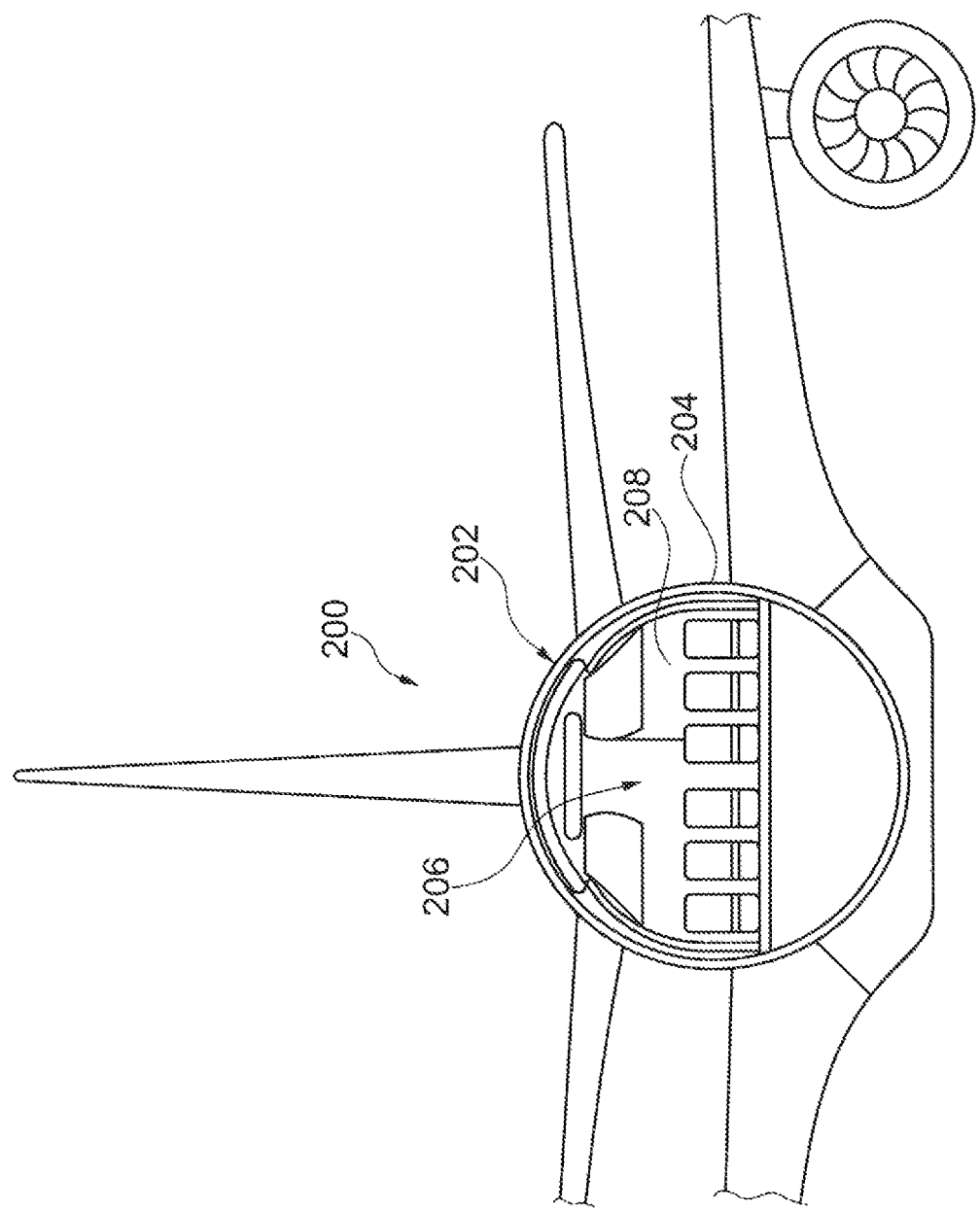

DUAL MODE TOILET ASSEMBLY

CROSS-REFERENCE TO RELATED APPLICATION

This application claims priority to European Patent Application No. 15196817.9, filed Nov. 27, 2015, which is incorporated herein by reference in its entirety.

TECHNICAL FIELD

The present embodiment relates to a toilet assembly, and relates in particular to a passenger lavatory unit, to an on-board interior space structure and to a vehicle.

BACKGROUND

Lavatories are used for passengers, for example on board of vehicles such as an aircraft, a train carriage or a coach (bus). A toilet is usually provided inside an enclosure thus forming a lavatory. The toilet may be provided as a so-called sitting toilet, i.e. a toilet with a seat on which a passenger can sit during use. For example, DE 10 2011 012281 describes a sitting toilet in a lavatory room on board an aircraft in relation with sanitation related aspects. Another type of toilet is a so-called squatting toilet, i.e. a toilet where a user squats during the use of the toilet, and does not sit on a toilet seat. The two different types of toilets are commonly associated with different regions throughout the world, in which regions the respective type is primarily used. However, it has been shown that passengers familiar with one of the two types may feel uncomfortable with using a toilet of the respective other type of toilet. This may become an issue, for example, on board of a vehicle, with which a large number of different people from various regions of the world are travelling.

SUMMARY

There may thus be a need to provide a toilet assembly onboard a vehicle providing increased user comfort.

The object of the present embodiment is solved by the subject-matter of the independent claims, wherein further embodiments are incorporated in the dependent claims. It should be noted that the following described aspects of the embodiment apply also for the passenger lavatory unit, for the on-board interior space structure, and for the vehicle.

According to a first aspect of the present embodiment, a passenger lavatory unit is provided that comprises an enclosing structure and a toilet assembly. The enclosing structure at least partly encloses a lavatory space. The toilet assembly is arranged inside the lavatory space. The toilet assembly comprises a toilet bowl for receiving and discharging faeces material. The toilet assembly also comprises a shroud structure for providing a support for the user during use of the toilet. The toilet assembly is provided as a hybrid toilet configured to be used as a sitting toilet in a first mode of use, and as a squatting toilet in a second mode of use. The shroud comprises an upper edge at least partly surrounding an upper opening of the toilet bowl. For allowing the user to adopt a sitting position during the first mode of use, the upper edge is provided as a toilet seat, or toilet seat structure, and a feet-placing area is provided on a floor segment in front of the toilet assembly. The shroud also comprises two lateral tread portions, one on either side of the toilet bowl. For allowing the user to adopt a squatting position during the second mode of use, the tread portions are provided as elevated footrest platforms, which are arranged on an intermediate level provided above a floor level and below a toilet seat level.

The lavatory space is also referred to as a lavatory interior space. The term passenger lavatory unit relates to a lavatory on-board a vehicle provided for passengers, as well as for crew members.

It is noted that in relation with the present embodiment, the term "passenger" relates to people that are on board the vehicle while the vehicle is moving, i.e. during motion, travel or cruise. The term passenger thus comprises passengers (as so-to-speak guests on board the vehicle), operating staff and other crew members. Instead of "passenger", also the term "user" is used in relation with the use of the toilet.

The term "hybrid toilet" relates to a toilet with two different modes of use integrated into one toilet. The hybrid toilet can also be referred to as bi-functional toilet or dual-mode toilet.

The term "squatting toilet" relates to a toilet that is used by the user in a squatting position, in which the user rests on his feet. The squatting toilet is also referred to as squat-toilet. The term "sitting toilet" relates to a toilet that is used by the user in a sitting position, in which the user sits on an upper toilet seat (or on a seat-like structure). The sitting toilet is also referred to as sit-toilet. The terms "sitting" and "squatting" relate to the primary use, i.e. the intended main use. The terms "sitting" and "squatting" relate to the posture of the user during the defecation, i.e. during the defecation procedure, that is they relate to defecation posture. The terms may of course also relate to the user's posture during urination.

Other modes of use may also be possible, but may not be the preferred and intended modes of use. For example, the toilet may also be used in particular by male users in an upright or standing position, for example for urination.

The term "shroud" relates to a housing-like structure that provides a cover and housing function for the toilet bowl as well as a supporting function (supporting structure) for the user and for providing the load bearing for the user during the use of the toilet. The shroud also provides an upper opening edge of the toilet bowl. For this purpose, the shroud is provided with an interface section for functional connection with the toilet bowl. In an example, the shroud is provided as resting on the toilet assembly (e.g. toilet bowl, toilet base etc.). In another example, the shroud is provided with a support sub-structure resting on the floor structure, e.g. load bearing/transmission into the floor pan.

Instead of "shroud", also the term "shroud structure" is used.

According to an example, the toilet bowl and the shroud structure are provided as distinct components. Preferably, the shroud is mounted to be exchangeable, whereas the toilet bowl is preferably configured to remain mounted and connected.

For allowing the exchange, the toilet bowl and the shroud structure are separated in the functions they have to fulfill.

In an example, the toilet bowl and the shroud structure are separate components. However, they can be connected in a mounted state. The provision as distinct components allows to exchange the shroud for example in cases where the preferred use, i.e. waxy of operation has changed. Replacing the shroud may then turn the dual mode toilet into a sitting or into a squatting toilet.

In an example, the toilet bowl stays connected to supply lines and discharge ducts while the shroud can be renewed or replaced.

The toilet bowl is a structure that provides a bowl-like container or receptacle for receiving the faeces material. The bowl is connected to discharge conduits and to supply conduits arranged for flushing and cleaning of the toilet bowl. A support stand for the bowl may be arranged below the bowl-like receptacle.

According to an example, the shroud structure is a one-piece structure that provides a multifunctional supporting cover structure, which transfers load from the upper edge and from the tread portions to a floor structure, and which covers the toilet bowl while providing access to the upper opening of the toilet bowl.

In an example, the shroud is provided as supporting structure for the loads of the passenger, and the toilet bowl is provided below, arranged for not carrying the passenger load.

For example, the shroud provides a cover of the toilet bowl not only from a top, leaving access to the upper opening of the bowl, of course, but also provides a cover of the toilet bowl from the front or side.

The provision of the shroud and toilet bowl allows a facilitated manufacturing, and also an easier refurbishment, adaptation to changing user habits, and repair.

In an example, rigid structural support members are provided below the shroud that transmit load bearing forces from the upper edge and/or the tread portions (i.e. treads) into structural members, such as the floor pan or other suitable structural elements. The rigid structural support members thus form a structural or load bearing sub-structure.

In an example, the tread portions are supported by load transmission elements that are transmitting the forces into the toilet bowl structure or into the floor construction.

The shroud provides at least a visual connection to the toilet bowl, the floor surface, the lateral wall segments and the rear wall section. The connection to the adjacent walls and floor portions may be provided as a sealing connection to facilitate cleaning of the interior, e.g. by providing a sealing arrangement along the interconnecting parts.

The term "on either side" of the toilet bowl relates to left and right of the toilet bowl when standing in front of the toilet assembly, or to left and right of the toilet bowl when sitting on the toilet seat or when arranged in the squatting position. The toilet assembly comprises a virtual longitudinal axis. This longitudinal axis is primarily defined by the intended use, both in the sitting and in the squatting mode. The longitudinal axis thus defines left and right in relation with the user. The longitudinal axis thus relates to the sagittal plane of the user. The longitudinal axis may also be visible in form of an elliptic or oval shape of the toilet bowl or toilet seat, but these can also be arranged in a more circular shape. It is noted that the longitudinal axis is given by the normal intended mode of use.

In an example, the longitudinal axis of the toilet assembly is oriented in a perpendicular manner to the wall segment, in front of which the toilet is arranged.

In a further example, the longitudinal axis of the toilet assembly is oriented in a parallel or perpendicular manner to an axis defined by the extension of the interior space. For example, the space has a rectangular shape in relation with the floor space, but slightly inclined walls enclosing the space, e.g. caused by walls that conform with a shape of the fuselage in an aircraft. In another example, the longitudinal axis of the toilet assembly is oriented in a slightly slanted or inclined angle, i.e. slightly deviating from the perpendicular arrangement. For example, the longitudinal axis is having a deviation from the perpendicular (=90° in the range of approximately 5° to 25°.

The tread portions are also referred to as treads, or footrest areas, or as pedestal areas, or pedestal platforms. The tread portions provide so-to-speak lateral steps for allowing a user to achieve a squatting position or squatting gesture, in which the user rests above the upper edge of the shroud without having to touch the upper edge. The tread portions provide the necessary elevation (or lifting effect) of the user to allow such contactless squatting position, while still allowing the use of the toilet in a sitting mode, in which a contact with the tread portions is prevented.

The term "floor level" relates to the height level of the floor inside the lavatory, e.g. the floor in front of the toilet assembly. The term "toilet seat level" relates to the height level of a toilet seat or the upper edge of the shroud.

The term "approximately halfway between" relates to a range of approximately $1/5$ of the distance to approximately $4/5$ of after the distance, e.g. +/−10 percent.

In an example, the tread portions are formed integrally with the shroud.

Handle portions or grip portions may be provided in the vicinity of the toilet to provide support options during use of a toilet, in particular as a squat toilet.

The provision of the toilet assembly as a hybrid toilet allows the two above described modes of use, namely the sitting mode and the squatting mode. Hence, passengers or crew members that are more familiar with using a toilet in a sitting mode can use the lavatory unit with the same degree of comfort as passengers or crew members that are more used to use a toilet in a squatting mode. The hybrid toilet allows all passengers to use the toilet in their preferred way. The possibility to use the hybrid toilet in two types is based on providing the two lateral tread portions on the intermediate level, thus leaving the upper edge of the shroud as an upper opening that can be used as a toilet seat. Due to elevating the footrest platforms, the user is allowed to have a squatting gesture while resting above the upper edge and thus ensuring a contactless use in the squatting mode. Hence, a lavatory is provided for passengers that can be used in two ways, thus meaning an increase in the user's comfort, while still being compatible for two different approaches for using a lavatory unit, i.e. the toilet.

According to an example, the intermediate level is provided approximately halfway between the floor level and a toilet seat level. This provides the effect that to step onto the footrest platforms is possible for the majority of passengers, for example in a range starting from a minimum defined by the female Japanese 5% percentile to a maximum defined by the male North-American 95% percentile, e.g. relating to a body size of 148 cm to 190 cm.

According to an example, the toilet seat level is provided in the range of approximately 35 to 55 centimeters above the floor level, e.g. 40 to 50 centimeters, wherein the intermediate level is provided in the range of approximately 15 to 35 centimeters, for example, 20 to 30 centimeters, above the floor level.

According to an example, the shroud comprises the upper edge and the tread portions as a one-piece structure. This allows a facilitated manufacturing process, and also facilitates mounting and demounting procedures.

In an example, the shroud is mounted to a wall structure and to the floor structure, wherein the shroud transfer the user's load to the wall structure and the floor structure. The toilet bowl can also be used for load transfer from the shroud. However, in an example, the shroud spans more or less in a free manner across the toilet bowl.

In an example, the shroud is a self-supporting structure.

According to an example, the tread portions are provided as lateral pedestal sections that extend from the toilet bowl to adjacent space-enclosing surfaces.

As an example, the tread portions provide continuous footrest platform between the toilet bowl and the wall segments besides the toilet.

The term "space-enclosing surface" relates to surfaces such as wall segments that define the shape of the interior space or volume. Besides wall segments, the space-enclosing surfaces can also be formed by interior structures arranged in the lavatory, e.g. by enclosing surfaces of cabinets or storage compartments.

In an example, the space-enclosing structure comprises wall segments and a floor segment. In an example, the term "wall segment" also relates to surfaces of interior equipment, such as cabinets and storage volumes.

By providing the tread portions extending to adjacent space-enclosing surfaces, the user's comfort is further increased, since the pedestal sections are provided with a maximum size, and gaps are avoided.

According to an example, the tread portions are provided with a front edge that is displaced
in relation to a formed edge of the shroud. The term "front" edge relates to the part of the shroud that is facing the lavatory room, whereas "rear" or back in relation with the toilet assembly relates to the part that faces away from the lavatory room, i.e. the part facing the wall segment behind the toilet assembly.

In an example, when viewed from atop, or when projected on a floor plane, the front edge of the toilet bowl is extending beyond the front edges of the tread portions, i.e. the front edges of the tread portions are displaced in a backward manner. This also improves user comfort in the sitting position and also reduces the impact of the tread portions on the space occupied by the thread portions. As a further effect, the toilet can also be used in a standing mode, for example for male passengers.

According to an example, the tread portions are provided as overhanging portions that project in a forward manner such that a floor rest portion is provided below at least a part of the tread portions.

In an example, it is provided that the user can place his feet at least partly below the tread portions. As an effect, the user's comfort is further increased by providing an increased space for allowing the resting position of the user's feet during the use of the toilet, thus ensuring various configurations for using the toilet.

According to an example, the upper edge of the shroud comprises an elevation front portion providing a splash-guard. As a result, the splash-guard provides protection from liquid droplets reaching the area in front of the toilet bowl. For example, the splash-guard is suitable during the second mode of use, i.e. the squatting mode.

According to an example, a toilet lid is provided that is pivotably mounted by a hinge at a rear portion of the upper edge. The toilet lid is foldable along a line parallel to a pivoting axis of the hinge.

The lid is foldable such that an opening the lid, the lid extends upwardly only for half the length of the lid. The lid is thus provided as a two-part lid that is folded in half in the opened position. A toilet seat may be provided, alternatively or in addition, to be also two-part foldable.

According to an example, in addition to the upper edge of the shroud, a movable toilet seat is provided that is pivotably mounted by a hinge at the rear portion of the upper edge. As an option, the toilet seat is foldable along a line parallel to the pivoting axis of the hinge.

According to an example, the toilet assembly is provided as a configurable toilet kit with at least a first type of shroud and a second type of shroud. The first type of shroud is provided as a shroud with the upper edge and two lateral tread portions for a dual mode toilet type. The second type of shroud is provided as a shroud with only an upper edge for a sitting toilet type. The first and the second type of shroud are provided as exchangeable shrouds configured to be replaced with the respective other type of shroud.

In an example, the shroud and the toilet bowl are separate items with different replacement or adaptation cycle times.

For example, the shroud can be replaced during a turnover time of an aircraft. During a re-configuration, the toilet bowl including supply infrastructure remains. For an easy and quick replacement, the shroud is provided with plug-in-connections to the toilet bowl. The lateral connections with interior space-enclosing wall surfaces may be provided by abutting connections forming abutting sealing structures.

The provision as a kit allows, for an example, also a repeatedly adaptable, or continuous, retrofitting. The provision as a kit in particular allows adapting a vehicle to the expected field of use. For example, an aircraft primarily used in the Asian region may be equipped with a majority of dual-mode toilets. If an operating airline then decides to use such aircraft primarily for European destinations, were mostly European passengers can be expected, the dual-mode toilets can temporarily be replaced with sitting toilet structures. This only requires the replacement of the shrouds. The structure below with all relevant technical interfaces and connections can remain.

According to a second aspect of the present embodiment, an on-board interior space structure is provided that comprises at least one passenger section for accommodating passengers, and at least one passenger lavatory unit according to one of the above-described examples. The at least one passenger lavatory unit is accessible from the at least one passenger section.

This allows the passengers to use the lavatory unit having an increased user comfort.

The term "on-board" relates to an interior space of the vehicle. For example, the on-board interior space is a cabin space in an aircraft for a cabin section, or for a coach (bus) or a partition or compartment in a carriage, or a saloon coach.

In an example, the on-board interior space structure is a cabin structure, e.g. of an aircraft.

According to a third aspect of the present embodiment, a vehicle is provided that comprises a body structure and at least one on-board interior space according to the preceding examples with at least one lavatory unit according to one of the above-mentioned examples. The vehicle is provided as at least one of the group of a train carriage, a coach and an aircraft. The at least one on-board interior space is provided by the body structure.

For example, the at least one lavatory unit is arranged within the at least one interior space.

According to an example, the vehicle is an aircraft, the body structure is a fuselage structure, and the fuselage accommodates the at least one interior space in form of at least one cabin structure. The at least one lavatory unit is arranged within the at least one cabin structure.

According to an aspect, a toilet is provided that has a particular adapted shroud that allows the passenger to use the toilet in a sitting mode and also in a squatting mode.

Thus, the two basic different types of use for using a toilet are both reflected in a single type of toilet, namely the hybrid toilet. This is achieved by a particular configuration of the shroud providing an upper seat for the sitting mode of use, and laterally arranged elevated platforms for the squatting mode of use.

According to certain embodiments, the shroud and the toilet bowl are separate structures, i.e. two separate components that form the hybrid toilet when combined.

These and other aspects of the present embodiment will become apparent from and be elucidated with reference to the embodiments described hereinafter.

BRIEF DESCRIPTION OF THE DRAWINGS

Exemplary embodiments of the embodiment will be described in the following with reference to the following drawings:

FIG. 16 schematically illustrates a cross-section of an example of a vehicle.

DETAILED DESCRIPTION

Figure 1:
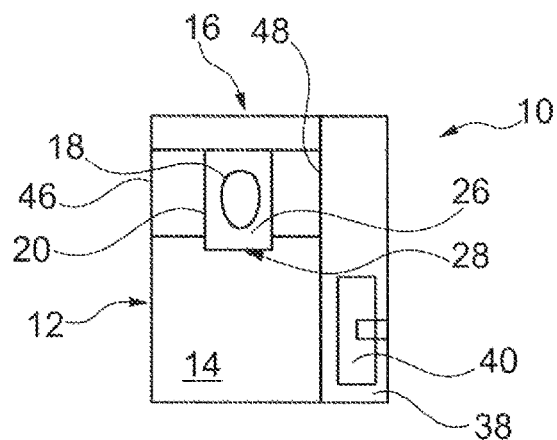
FIG. 1 schematically illustrates a first example of a passenger lavatory unit in a top view.

FIG. 1 shows a passenger lavatory unit 10 in a top view. The passenger lavatory unit 10 comprises an enclosing structure 12 that at least partly encloses a lavatory space 14. Further, a toilet assembly 16 is provided that is arranged inside the lavatory space 14. The toilet assembly 16 comprises a toilet bowl 18 for receiving and discharging faeces material. Further, a shroud structure 20 is arranged for providing a support for the user during use of the toilet.

The toilet assembly 16 is provided as a hybrid toilet, or dual mode toilet assembly, configured to be used as a sitting toilet in a first mode of use, and as a squatting toilet in a second mode of use (see also below). The shroud structure 20 (or shroud) comprises an upper edge 22 (see also FIG. 2) at least partly surrounding an upper opening 24 of the toilet bowl 18. For allowing the user to adopt a sitting position during the first mode of use, the upper edge 22 is provided as a toilet seat 26, and a feet-placing area 28 is provided on a floor segment in front of the toilet assembly. The shroud comprises two lateral tread portions 30 on either side of the toilet bowl 18. For allowing the user to adopt the squatting position during the second mode of use, the tread portions 30 are provided as elevated footrest-platforms, which are arranged on an intermediate level 32 provided above a floor level 34, and below a toilet seat level 36.

Figure 2:
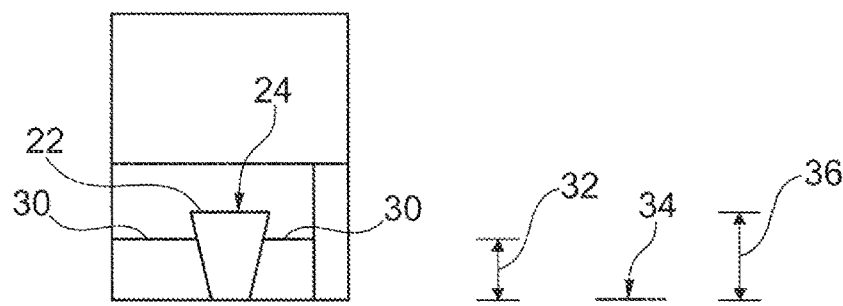
FIG. 2 shows the example of FIG. 1 in a front elevation.
Figure 3:
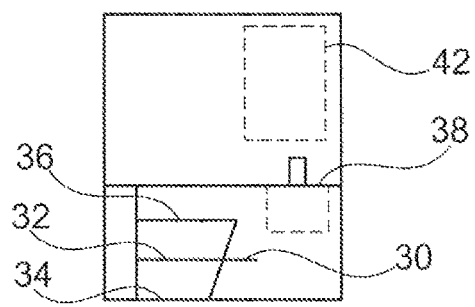
FIG. 3 shows the example of FIGS. 1 and 2 in a side elevation.

FIG. 2 shows a front elevation inside the lavatory unit 10 of FIG. 1; and FIG. 3 shows a side elevation inside the lavatory unit 10 of FIG. 1.

In addition to the toilet assembly 16, as an option also a wash basin 38 with a sink 40 can be provided. In FIG. 3, also a mirror 42 is indicated as a further option. Of course, as still further options, also other interior features can be provided inside the lavatory space 14 of the passenger lavatory unit 10. In FIG. 3, the two lateral tread portions 30 are indicated, together with an indication of the intermediate level 32, the floor level 34, and the toilet seat level 36.

In the following, i.e. relating to FIGS. 4 to 11, primarily the shroud 20 is described, and the adjacent wall structures or interior surfaces are not further shown for visibility reasons.

Figure 4:
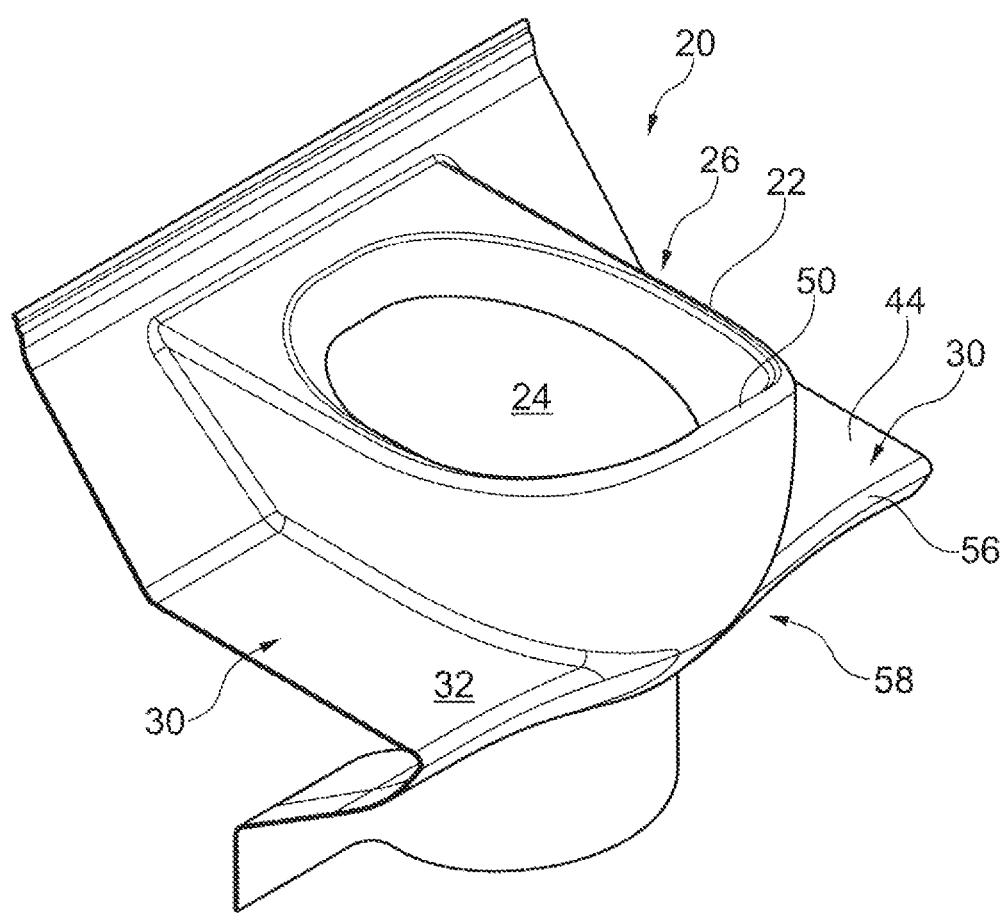
FIG. 4 shows a perspective illustration of an example of a hybrid toilet.

In FIG. 4, a further example of the shroud 20 is illustrated. As an option, the intermediate level 32, i.e. the arrangement of the tread portions 30 as the elevated footrest-platforms, is provided approximately halfway between the floor level 34 and the toilet seat level 36. For example, the toilet seat level 36 is provided in a range of approximately 40 to 50 centimeters above the floor level 34. The intermediate level 32 can thus be provided arranged approximately 20 to 30 centimeters above the floor level.

As an option it is provided that the shroud 20 comprises the upper edge 22 and the tread portions 30 as a one-piece structure.

As indicated in FIG. 4, in an option, the shroud is provided as self-supporting structure that allows transfer of loads (from sitting/squatting user) and that provides a cover for the toilet bowl.

The tread portions 30 are provided as lateral pedestal sections 44 that extend from the toilet bowl to adjacent space-enclosing surfaces, such as a lateral side wall 46 (see FIG. 1) or a lateral cabinet 48 (see also FIG. 1).

As an option, the example of FIG. 4 is arranged such that the upper edge 22 of the shroud 20 comprises an elevated front portion 50 providing a splash-guide.

Figure 5:
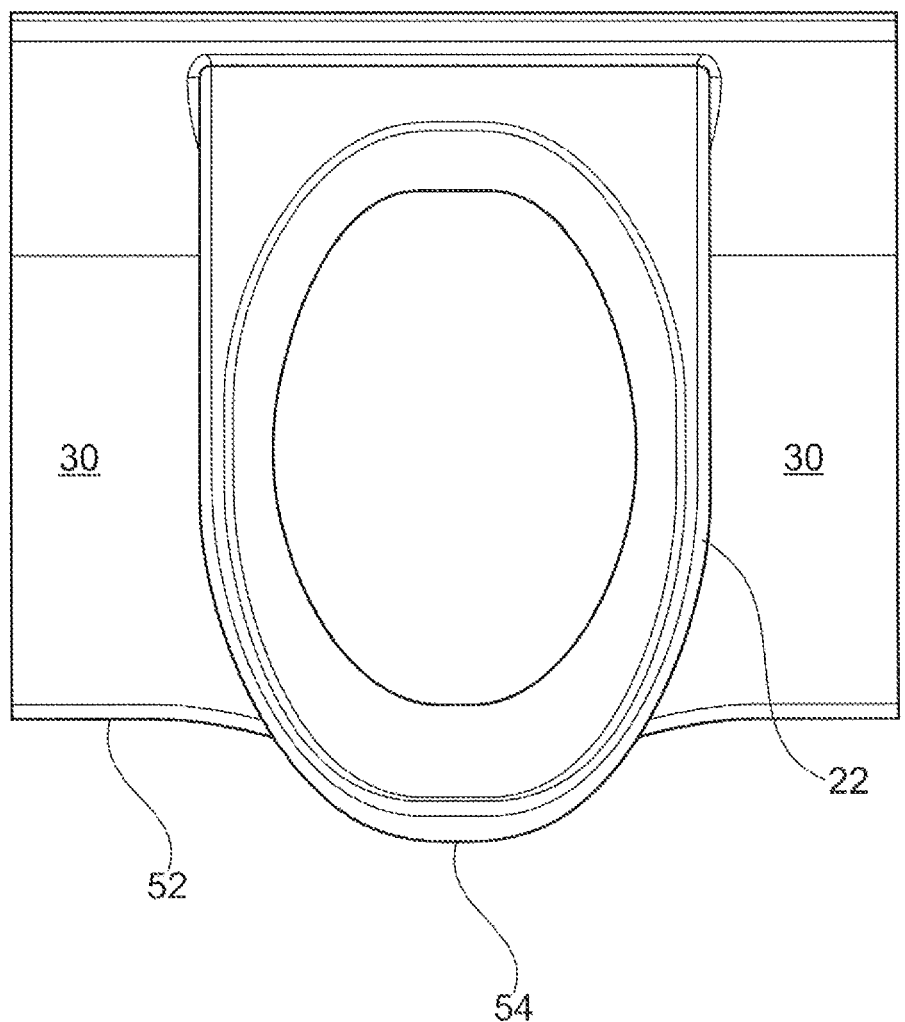
FIG. 5 shows a top view of the example of FIG. 4.

In FIG. 5, a top view of the example of FIG. 4 is shown. As an option, the tread portions 30 are provided with a front edge 52 that is displaced in relation to a front edge 54 of the shroud.

Figure 6:
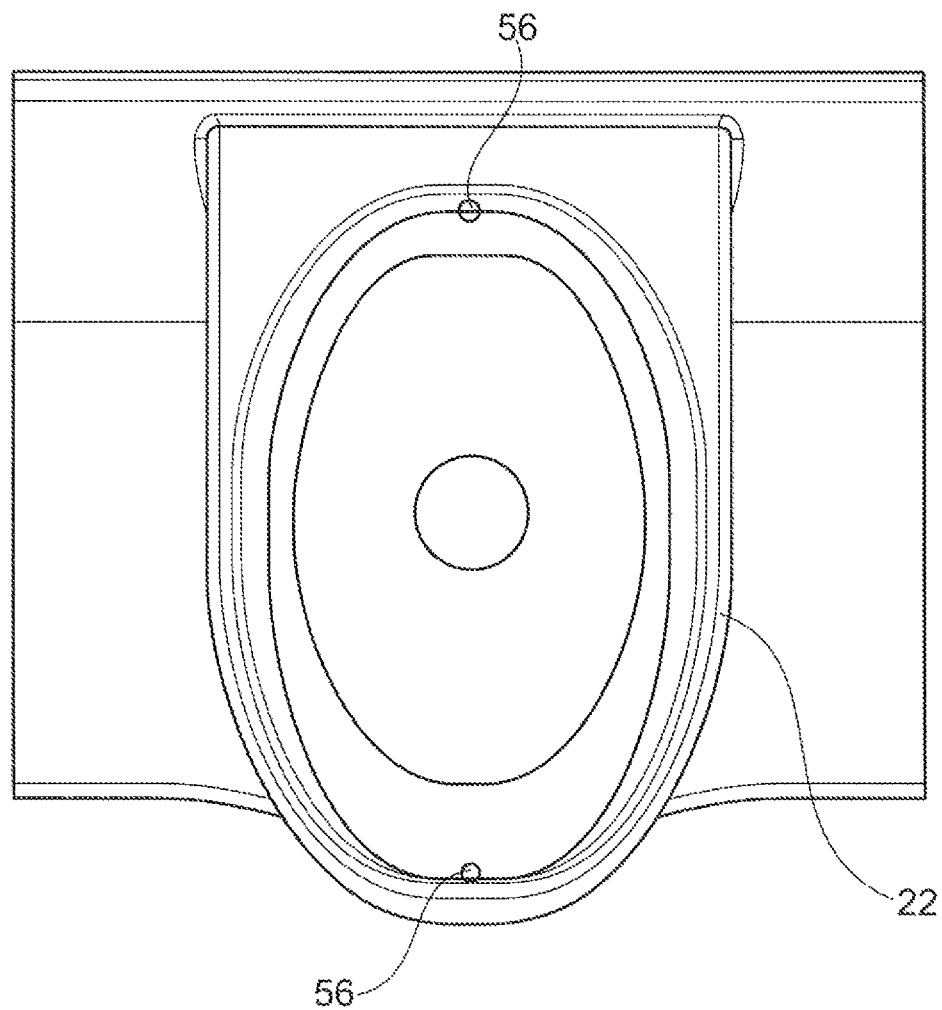
FIG. 6 shows a further top view of the example shown in FIG. 4.

FIG. 6 shows a further top view illustration. As an option, one or more integrated cleaning nozzles 56 are provided along an inner rim of the upper edge 22.

With reference to FIG. 4, as a further option it is provided that the tread portions 30 are provided as overhanging portions 56 that project in a forward manner such that the floor rest portion 58 is provided below at least a part of the tread portions 30.

Figure 7:
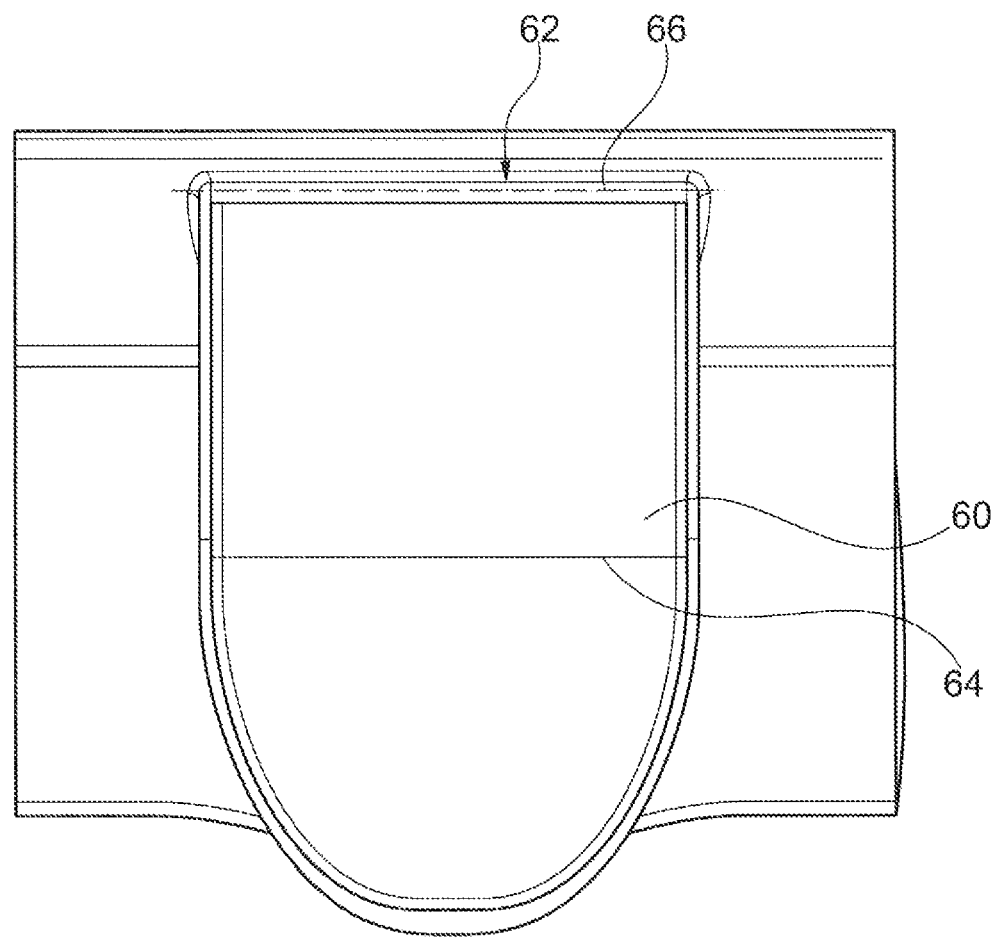
FIG. 7 shows a further top view of the example of FIG. 4.

In FIG. 7, a top view is shown. As an option, a toilet lid 60 can be provided that is pivotably mounted by a hinge 62 at a rear portion of the upper edge. The toilet lid 60 is foldable along a line 64 parallel to a pivoting axis 66 of the hinge 62.

Figure 8:
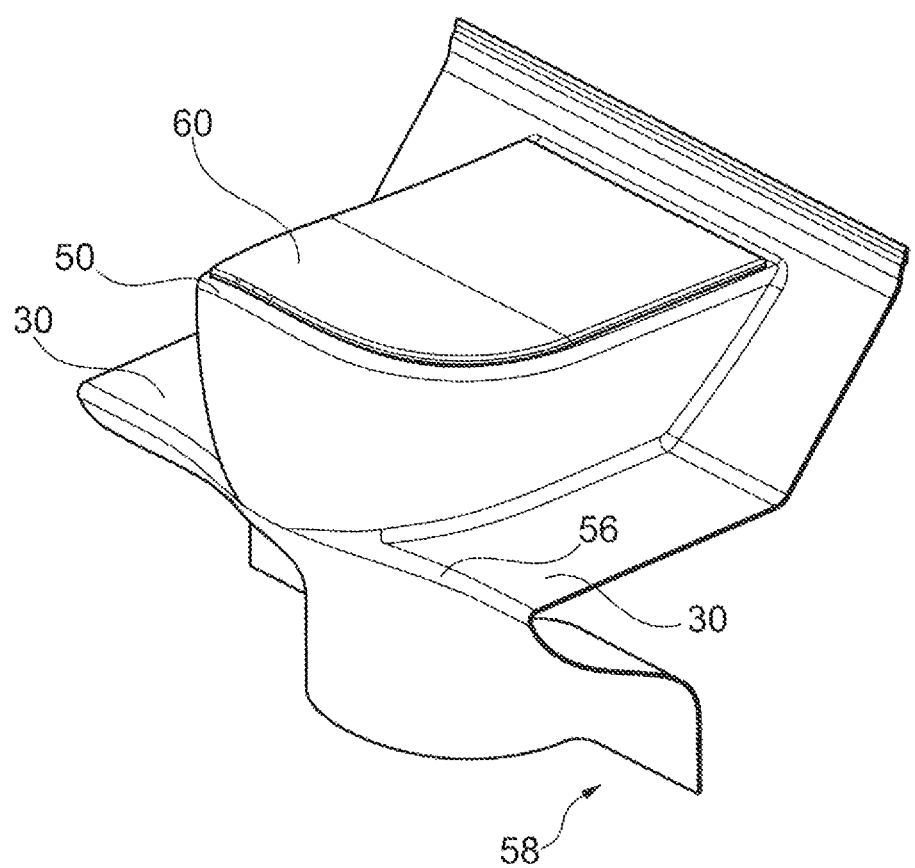
FIG. 8 shows a perspective view of the example shown in FIG. 7.

FIG. 8 shows a further perspective view of the example shown in FIG. 7.

Figure 9:
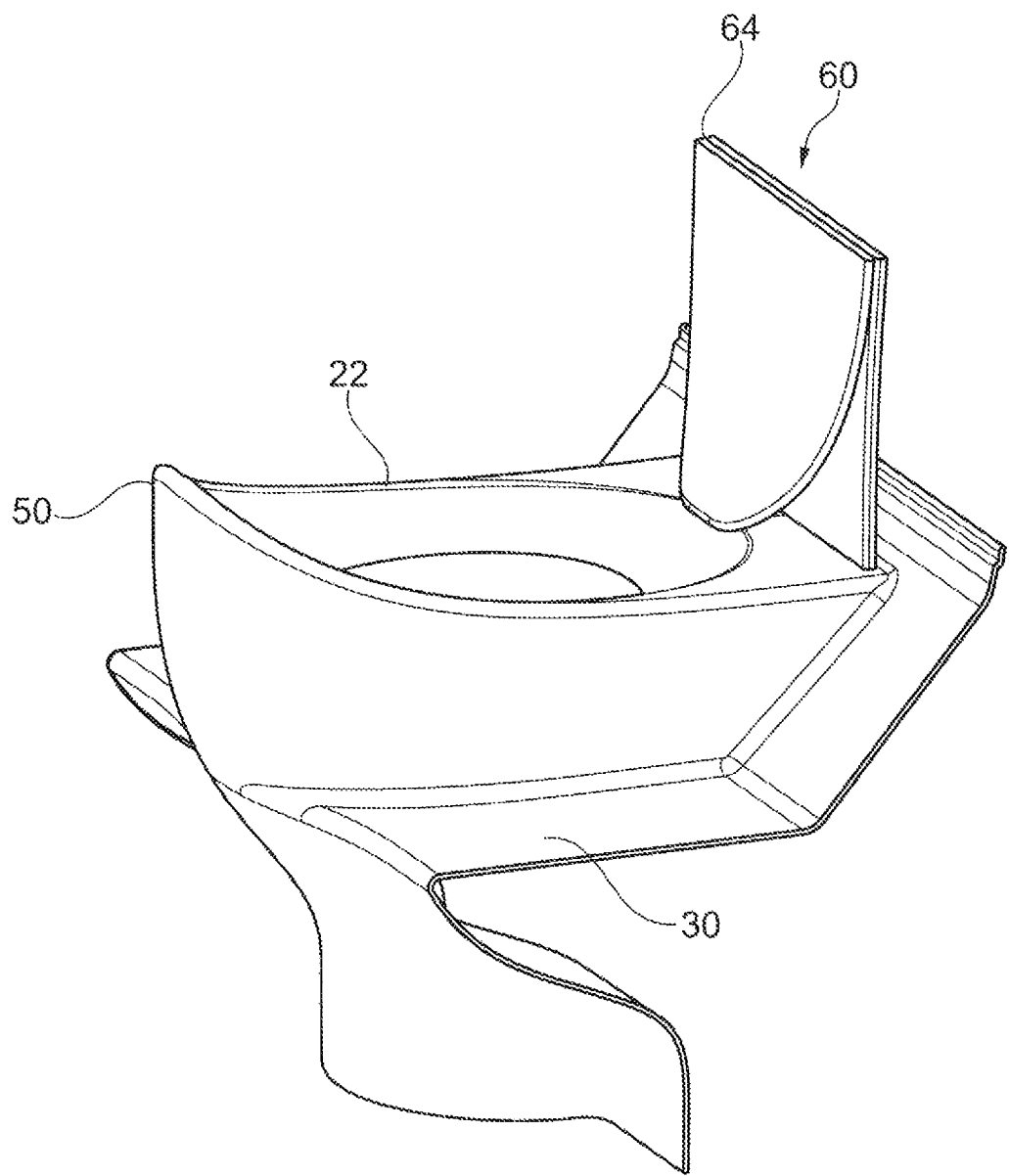
FIG. 9 shows a perspective view of the example shown in FIG. 8 with an opened toilet lid.

FIG. 9 shows a similar perspective view, but with the toilet lid 60 being opened. Due to the provision of the lid to be foldable, the lid 60 only extends upwardly for half of the length of the lid when opened. For example, this allows opening the lid 60 even if an adjacent inner wall structure of the lavatory unit is inwardly inclined, which may be caused by conforming of the inner wall with the shape of the adjacent fuselage structure (not further shown).

Figure 10:
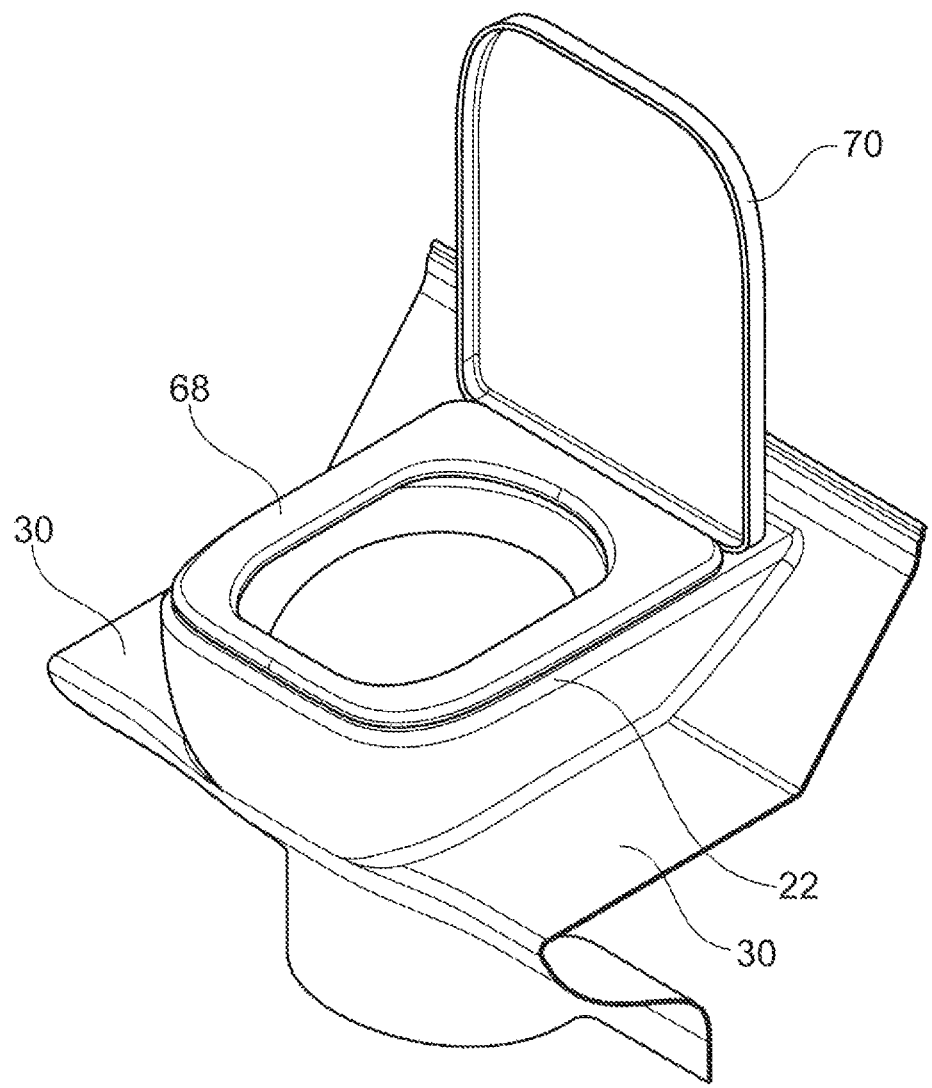
FIG. 10 shows a further example of a hybrid toilet in a perspective view.

FIG. 10 shows a perspective illustration of a further example. As a further option that can also be combined with the foldable lid described above for other options, such as overhanging portions 56 or the displacement of the front edges 52 to 54, a movable toilet seat 68 is provided that is pivotably mounted by a hinge at a rear portion of the upper edge.

In an example, the toilet seat and the lid are mounted to the shroud, which thus provides a load transferring structure. The shroud thus provides a supportive cover of the toilet bowl. The toilet bowl can thus be provided in view of the particular use of collecting and discharging liquids and mixed waste material.

As a further option (not further shown), the toilet seat 68 can also be foldable along a line parallel to a pivoting axis of the hinge, for example in order to allow an opened state of the seat even when the adjacent interior wall surface is arranged in an inwardly inclined manner. As a still further option, in addition to the toilet seat 68, a lid can be provided. As mentioned above, the lid 70 can be also provided to be foldable.

Figure 11:
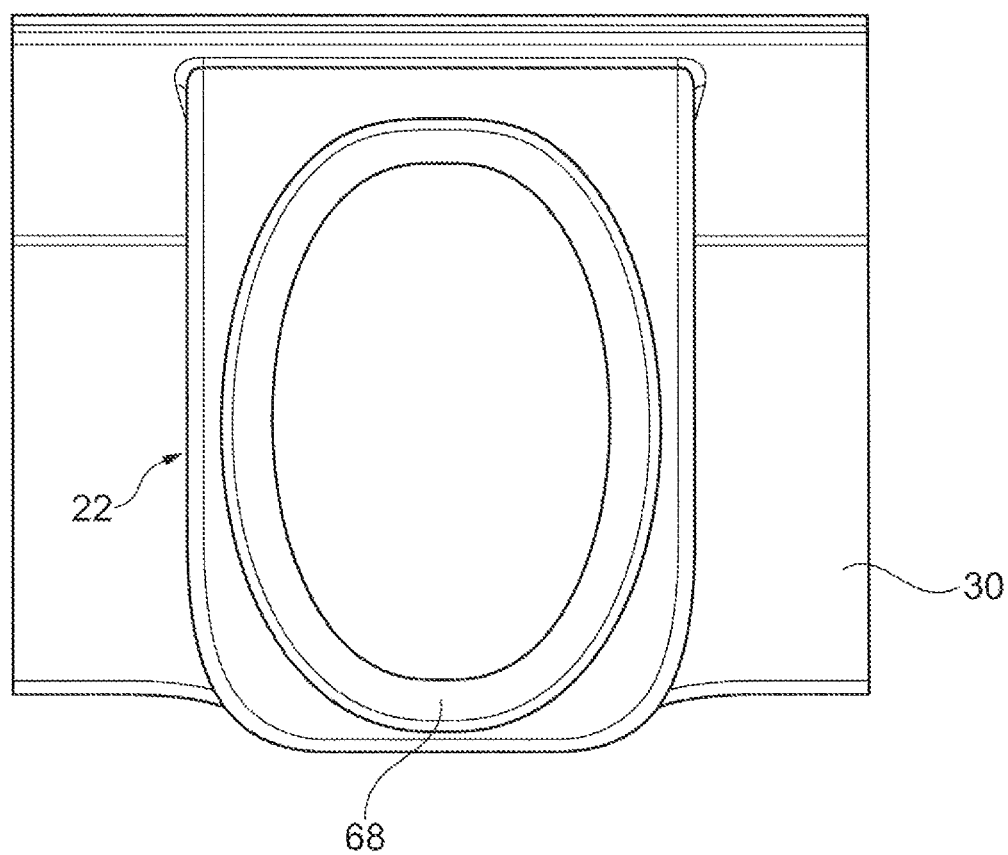
FIG. 11 shows a top view of the example shown in FIG. 10.

FIG. 11 shows the example of FIG. 10 in a top view.

In an example, not further shown, the toilet assembly 16 is provided as a configurable toilet kit that has at least a first type of shroud and a second type of shroud. The first type of shroud is provided as a shroud with the above-mentioned upper edge 22 and the two lateral tread portions 30 for a dual mode toilet type. The second type of shroud is provided as a shroud with only an upper edge for providing a sitting toilet type. The first and the second type of shroud are provided as exchangeable shrouds configured to replace the respective other type of shroud.

The separation of toilet bowl and shroud allows an adaptive change depending on the users' demands. The toilet bowl as the supplied and connected part of the toilet assembly can remain which avoids the need for re-installation.

Figure 12:
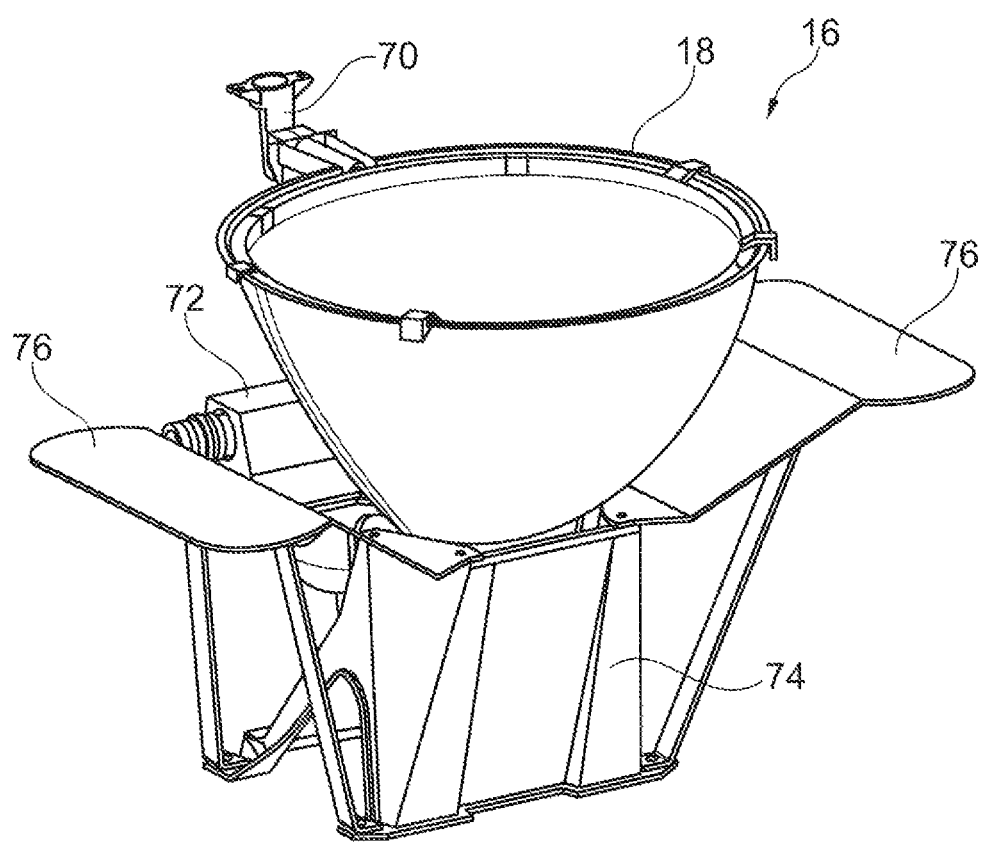
FIG. 12 shows a perspective view of an example of a load-bearing structure arranged below a shroud.

FIG. 12 shows an example of the toilet assembly 16 with a removed shroud. As can be seen, the toilet assembly 16 comprises the toilet bowl 18 connected to various supply lines 70 and discharge equipment 72. Further, a base unit 74 may be provided to provide support bearing for the toilet bowl 18.

In order to provide a further load-bearing support for the user in the squatting mode, as an option two lateral support surfaces 76 are arranged that are configured to abut the shroud 20 below the above-mentioned lateral tread portions 30. Hence, the load can be transferred directly into the floor pan or into structural members that are also used for the load-bearing of the toilet bowl 18.

As a further option, abutting elements 78 are provided that are configured to abut the shroud in the region of the upper edge below the respective surface, on top of which the user is expected to be sitting during the sitting mode. Hence, the toilet bowl 18 is also used for load-bearing purposes. As a result, the shroud 20 can have a decreased weight.

As a further option, the shroud 20 can be placed onto the toilet assembly with the above-described structural components from atop, thus further facilitating the mounting and assembly steps.

Figure 13:
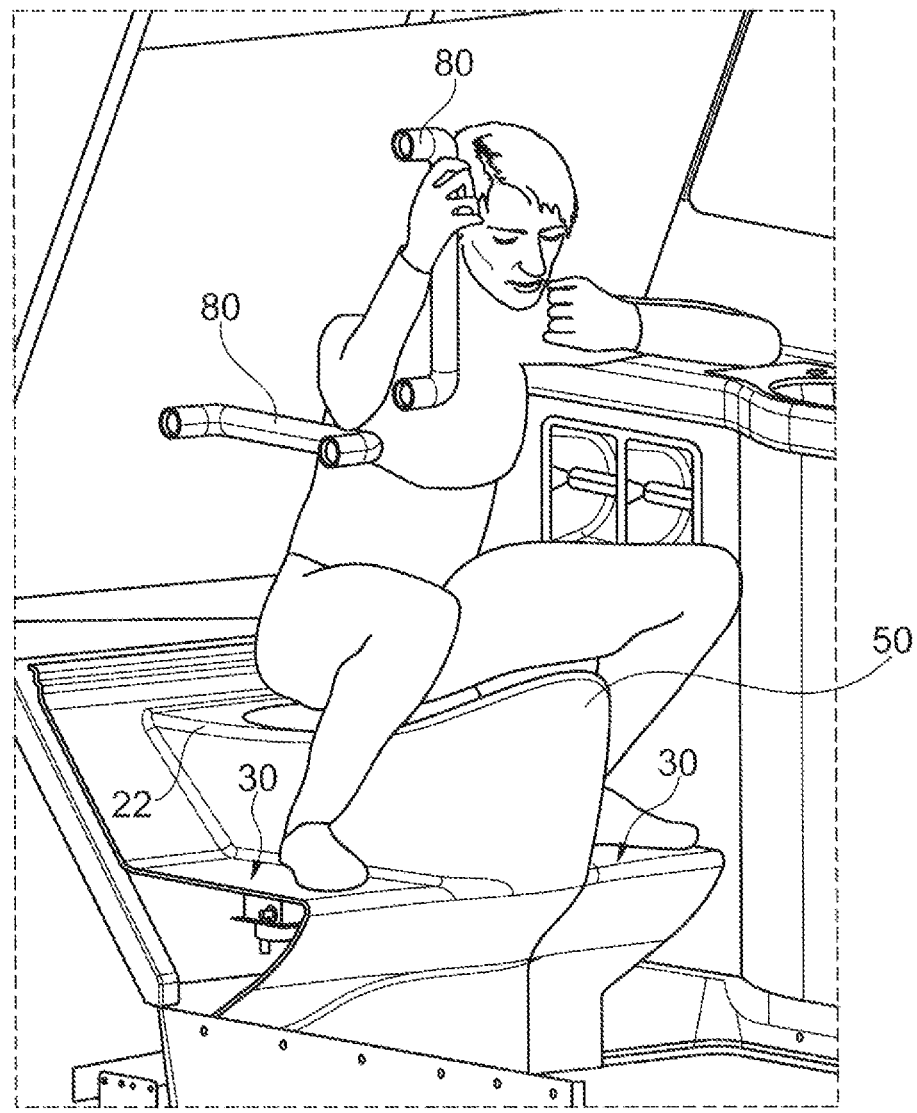
FIG. 13 schematically illustrates a passenger using an example of a hybrid toilet in a squatting mode.

FIG. 13 schematically illustrates a user using the hybrid toilet as a squatting toilet. As an option, further support handles 80 can be arranged in the vicinity of the toilet assembly 16 to provide further support during the squatting mode use in particular.

Figure 14C:
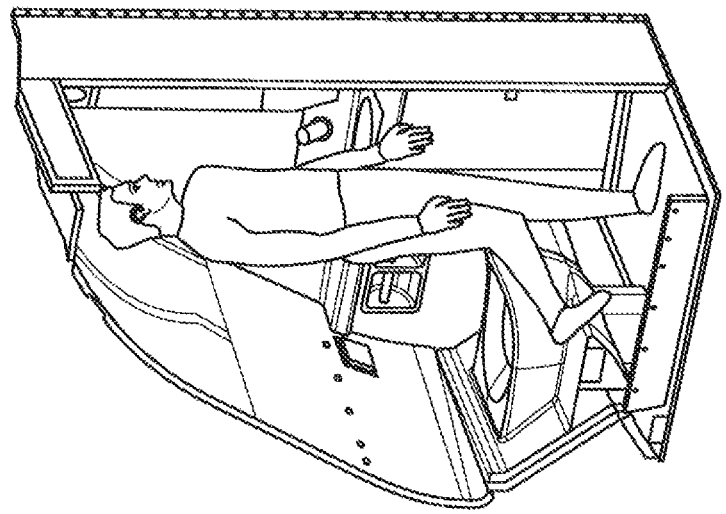
FIGS. 14*a*-14*f* shows different states of motion of a user when getting into the squatting mode for the use of the toilet.
Figure 14B:
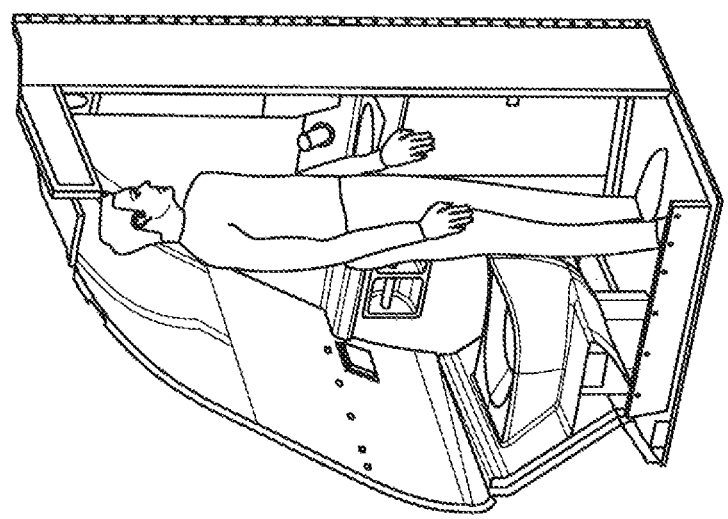
Figure 14A:
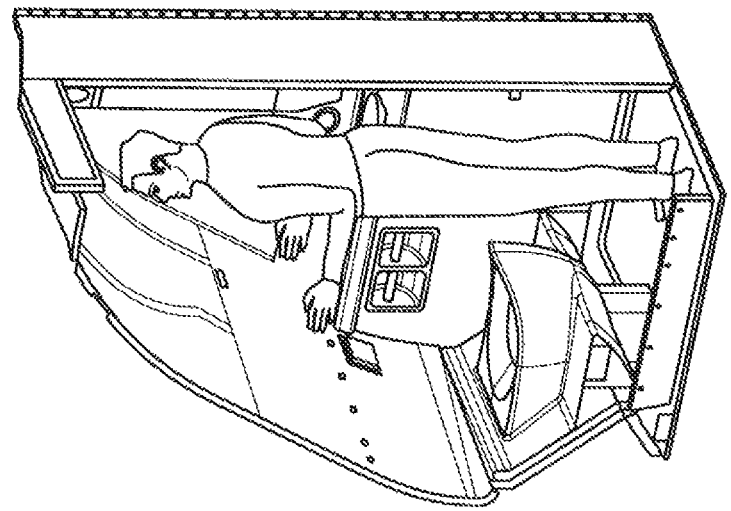
Figure 14F:
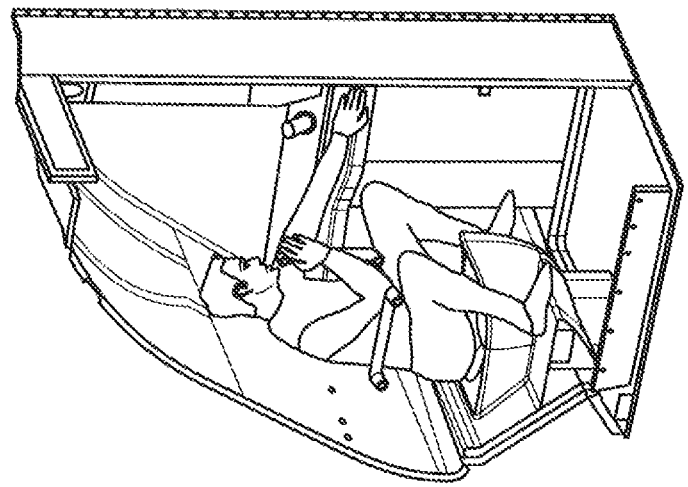
Figure 14E:
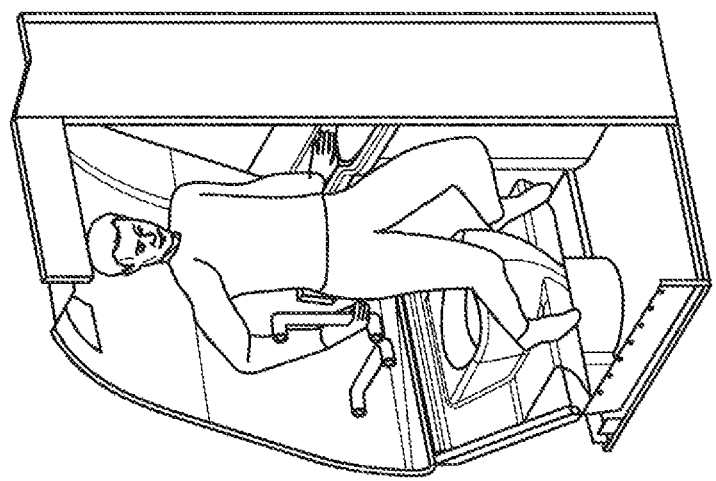
Figure 14D:
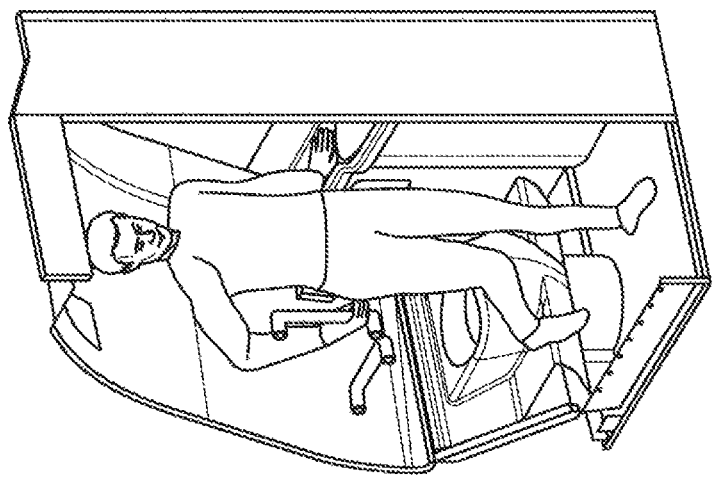

In FIGS. 14*a*-14*f*, a schematic graphic illustration is provided indicating the different steps when a user takes place on the toilet in the squatting mode. Starting with FIG. 14*a*, a user enters the room facing the toilet assembly. In FIG. 14*b*, the user has turned around and is now standing in front of the toilet assembly looking away from the toilet assembly towards the door. In the next step, shown in FIG. 14*c*, the user places one of his/her feet on one of the two lateral tread portions 30. As shown in FIG. 14*d*, the user then grasps one of the handles with the one hand and further rests the other hand on adjacent upper surface of the wash basin structure, to then lift also the other foot onto the other of the two lateral tread portions, as indicated in FIG. 14*e*. Upon standing on the two tread portions, the user can then knee down in the squatting position, as shown in FIG. 14*f*. Of course, for standing up again, a similar mirrored respective flow of steps can be used. It is noted that the illustrated steps only relate to one of many possible ways of getting into the squatting position and up again.

For use of the toilet in the sitting mode, not further shown in detail, the user-when being arranged in the standing mode of the middle top image-simply sits down onto the toilet using the upper edge 22 as the toilet seat 26.

Figure 15:
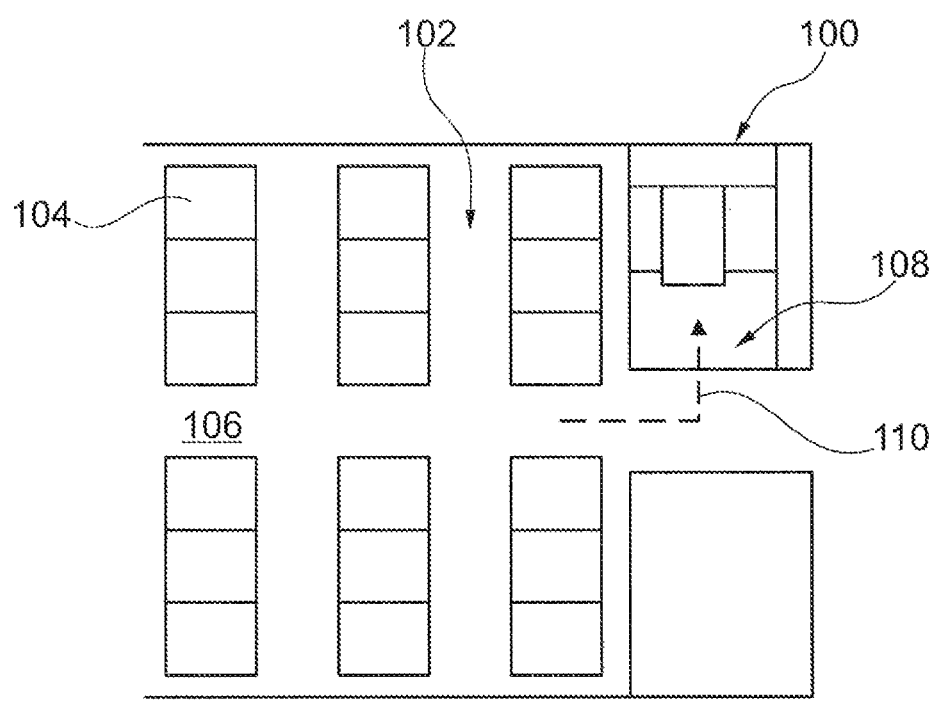
FIG. 15 schematically illustrates a floor plan of an example of an on-board interior space structure.

FIG. 15 shows a top view of an on-board interior space structure 100 that comprises at least one passenger section 102 for accommodating passengers. For example, passenger seats 104 are indicated that are arranged in a three-seat-configuration on both sides of an aisle 106. Of course, also other types of seat arrangements can be provided. Further, a lavatory unit 108 is provided. The lavatory unit 108 is provided as one of the examples of the passenger lavatory unit 10 described above. The at least one passenger lavatory unit 108 is accessible, as indicated with a dotted arrow 110, from the at least one passenger section 102.

FIG. 16 shows a schematic cross-section of a vehicle 200, for example an aircraft. The vehicle 200 comprises a body structure 202. In case the vehicle is the aircraft, the body structure is a fuselage structure 204, enclosing a cabin structure 206. The vehicle 200 further comprises at least one example 208 of the on-board interior space as discussed above. The at least one on-board unit space comprises at least one lavatory unit as described above in various examples.

The vehicle 200 is provided, for example, as a train carriage, or a coach, or an aircraft. As indicated, the at least one on-board interior space 208 is provided by the body structure 202.

For example, in case of an aircraft, the fuselage structure 204 accommodates the at least one interior space in form of at least one cabin structure 206. Hence, the at least one lavatory unit is arranged within the at least one cabin structure 206.

It has to be noted that embodiments are described with reference to different subject matters. In particular, some embodiments are described with reference to a device or unit, whereas other embodiments are described with reference to a structure and system, i.e. a vehicle. However, a person skilled in the art will gather from the above and the following description that, unless otherwise notified, in addition to any combination of features belonging to one type, also any combination between features relating to different claims is considered to be disclosed with this application. However, all features can be combined providing synergetic effects that are more than the simple summation of the features.

While the embodiment has been illustrated and described in detail in the drawings and foregoing description, such illustration and description are to be considered illustrative or exemplary and not restrictive. The embodiment is not limited to the disclosed embodiments. Other variations to the disclosed embodiments can be understood and effected by those skilled in the art in practicing a claimed embodiment, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A passenger lavatory unit, comprising:
    an enclosing structure at least partly enclosing a lavatory space; and
    a toilet assembly arranged inside the lavatory space, the toilet assembly comprising:
        a load bearing base unit;
        a toilet bowl for receiving and discharging material, the toilet bowl supported by the base unit;
        support structures coupled to the base unit and comprising two lateral support surfaces; and
        a one-piece shroud structure that is a separate and distinct component from the toilet bowl, the shroud structure configured to support a user during use of the toilet assembly and configured to cover the toilet bowl, the shroud structure having an interface section for a functional connection with the toilet bowl, and the shroud structure removably connected to the toilet bowl and the base unit;
    wherein the toilet assembly is provided as a hybrid toilet configured to be used as a sitting toilet in a first mode of use, and as a squatting toilet in a second mode of use;
    wherein the shroud structure comprises a toilet seat integrated therein and having an upper edge at least partly surrounding an upper opening of the toilet bowl, the toilet seat allowing the user to adopt a sitting position during the first mode of use;
    wherein a feet placing area is provided on a floor segment in front of the toilet assembly to allow the user to adopt the sitting position during the first mode of use;
    wherein the shroud structure comprises two lateral tread portions integrated therein, one on either side of the toilet bowl, and, for allowing the user to adopt a squatting position during the second mode of use, the lateral tread portions are provided as elevated rest-platforms, which are arranged on an intermediate level provided above a floor level and below a toilet seat level; and
    wherein the lateral support surfaces abut the shroud structure below the lateral tread portions to transfer load.

2. The passenger lavatory unit according to claim 1, wherein:
    the shroud structure is configured to be exchangeable; and
    the toilet bowl is configured to remain mounted and connected to the base unit.

3. The passenger lavatory unit according to claim 1, wherein the shroud structure is a multifunctional supporting cover structure, which transfers load from the upper edge and from the tread portions to a floor structure, and which covers the toilet bowl while providing access to the upper opening of the toilet bowl.

4. The passenger lavatory unit according to claim 1, wherein the intermediate level is provided approximately halfway between a floor level and a toilet seat level.

5. The passenger lavatory unit according to claim 1, wherein the toilet seat level is in the range of approximately 40 to 50 cm above the floor level, and the intermediate level is in the range of approximately 20 to 30 cm above the floor level.

6. The passenger lavatory unit according to claim 1, wherein the tread portions are provided as lateral pedestal sections that extend from the toilet bowl to adjacent space-enclosing surfaces.

7. The passenger lavatory unit according to claim 1, wherein the tread portions are provided with a front edge that is displaced in relation to a front edge of the shroud structure.

8. The passenger lavatory unit according to claim 1, wherein the tread portions are provided as overhanging portions that project in a forward manner such that a floor rest portion is provided below at least a part of the tread portions.

9. The passenger lavatory unit according to claim 1, wherein the upper edge of the shroud structure comprises an elevated front portion providing a splash-guard.

10. The passenger lavatory unit according to claim 1, further comprising a toilet lid that is pivotably mounted by a hinge at a rear portion of the upper edge, wherein the toilet lid is foldable along a line parallel to a pivoting axis of the hinge.

11. The passenger lavatory unit according to claim 1, further comprising a movable toilet seat that is pivotably mounted by a hinge at a rear portion of the upper edge, wherein, the toilet seat is foldable along a line parallel to a pivoting axis of the hinge.

12. The passenger lavatory unit according to claim 1, wherein:
    the toilet assembly comprises a configurable toilet kit comprising the one-piece shroud structure and a second type of shroud;
    the second type of shroud is provided with only an upper edge for a sitting toilet type; and
    the one-piece shroud structure and the second type of shroud are provided as exchangeable and replaceable components.

13. An on-board interior space structure comprising:
    at least one passenger section for accommodating passengers; and
    at least one passenger lavatory unit comprising an enclosing structure at least partly enclosing a lavatory space, and a toilet assembly arranged inside the lavatory space, the toilet assembly comprising:
        a load bearing base unit;
        a toilet bowl for receiving and discharging material, the toilet bowl supported by the base unit;
        support structures coupled to the base unit and comprising two lateral support surfaces; and
        a one-piece shroud structure that is a separate and distinct component from the toilet bowl, the shroud structure configured to support a user during use of the toilet assembly and configured to cover the toilet bowl, the shroud structure having an interface section for a functional connection with the toilet bowl, and the shroud structure removably connected to the toilet bowl and the base unit;

wherein the toilet assembly is provided as a hybrid toilet configured to be used as a sitting toilet in a first mode of use, and as a squatting toilet in a second mode of use;

wherein the shroud structure comprises a toilet seat integrated therein and having an upper edge at least partly surrounding an upper opening of the toilet bowl, the toilet seat allowing the user to adopt a sitting position during the first mode of use;

wherein a feet placing area is provided on a floor segment in front of the toilet assembly to allow the user to adopt the sitting position during the first mode of use;

wherein the shroud structure comprises two lateral tread portions integrated therein, one on either side of the toilet bowl, and, for allowing the user to adopt a squatting position during the second mode of use, the lateral tread portions are provided as elevated rest-platforms, which are arranged on an intermediate level provided above a floor level and below a toilet seat level;

wherein the lateral support surfaces abut the shroud structure below the lateral tread portions to transfer load; and wherein the least one passenger lavatory unit is accessible from the at least one passenger section.

14. A vehicle, comprising:

a body structure; and at least one on-board interior space having at least one lavatory unit comprising an enclosing structure at least partly enclosing a lavatory space, and a toilet assembly arranged inside the lavatory space, the toilet assembly comprising:

a load bearing base unit;

a toilet bowl for receiving and discharging material, the toilet bowl supported by the base unit;

support structures coupled to the base unit and comprising two lateral support surfaces; and a one-piece shroud structure that is a separate and distinct component from the toilet bowl, the shroud structure configured to support a user during use of the toilet assembly and configured to cover the toilet bowl, the shroud structure having an interface section for a functional connection with the toilet bowl, and the shroud structure removably connected to the toilet bowl and the base unit;

wherein the toilet assembly is provided as a hybrid toilet configured to be used as a sitting toilet in a first mode of use, and as a squatting toilet in a second mode of use;

wherein the shroud structure comprises a toilet seat integrated therein and having an upper edge at least partly surrounding an upper opening of the toilet bowl, the toilet seat allowing the user to adopt a sitting position during the first mode of use;

wherein a feet placing area is provided on a floor segment in front of the toilet assembly to allow the user to adopt the sitting position during the first mode of use;

wherein the shroud structure comprises two lateral tread portions integrated therein, one on either side of the toilet bowl, and, for allowing the user to adopt a squatting position during the second mode of use, the lateral tread portions are provided as elevated rest-platforms, which are arranged on an intermediate level provided above a floor level and below a toilet seat level;

wherein the lateral support surfaces abut the shroud structure below the lateral tread portions to transfer load;

wherein the vehicle is provided as at least one of the group of a train carriage, a coach, and an aircraft; and wherein the at least one on-board interior space is provided by the body structure.

15. The vehicle according to claim 14, wherein the vehicle is an aircraft, the body structure is a fuselage structure, and the fuselage structure accommodates the at least one interior space in form of at least one cabin structure; and wherein the at least one lavatory unit is arranged within the at least one cabin structure.

\* \* \* \* \*